United States Patent
Bradley et al.

(10) Patent No.: US 12,325,457 B2
(45) Date of Patent: Jun. 10, 2025

(54) PREDICTIVE CONTROL SYSTEM VISUALIZATION FOR AUTOMATIC TRAIN OPERATION

(71) Applicant: Progress Rail Services Corporation, Albertville, AL (US)

(72) Inventors: Colby Smith Bradley, Atlanta, GA (US); Sammy Akif, Northlake, TX (US); Konan Thomason, Eagleville, TN (US); Marcos Blanco Fernandes, Irving, TX (US)

(73) Assignee: Progress Rail Services Corporation, Albertville, AL (US)

( * ) Notice: Subject to any disclaimer, the term of this patent is extended or adjusted under 35 U.S.C. 154(b) by 159 days.

(21) Appl. No.: 18/094,925

(22) Filed: Jan. 9, 2023

(65) Prior Publication Data
US 2024/0227884 A1 Jul. 11, 2024

(51) Int. Cl.
*B61L 15/00* (2006.01)
*G06T 11/20* (2006.01)

(52) U.S. Cl.
CPC ......... *B61L 15/009* (2013.01); *B61L 15/0018* (2013.01); *B61L 15/0072* (2013.01); *G06T 11/206* (2013.01)

(58) Field of Classification Search
CPC ............... B61L 15/009; B61L 15/0018; B61L 15/0072; G06T 11/206
See application file for complete search history.

(56) References Cited

U.S. PATENT DOCUMENTS

| | | |
|---|---|---|
| 6,154,735 A | 11/2000 | Crone |
| 8,398,405 B2 | 3/2013 | Kumar |
| 8,768,543 B2 | 7/2014 | Kumar |
| 8,788,135 B2 | 7/2014 | Daum |
| 8,998,617 B2 | 4/2015 | Kumar |
| 2006/0074544 A1* | 4/2006 | Morariu ................. B61L 27/16 701/19 |
| 2009/0299555 A1* | 12/2009 | Houpt ..................... B61L 27/16 701/19 |

(Continued)

FOREIGN PATENT DOCUMENTS

| | | | |
|---|---|---|---|
| DE | 102017123766 A1 | 4/2019 | |
| EP | 2821314 A2 * | 1/2015 | .......... B61L 27/0027 |
| JP | 3195063 B2 | 3/1994 | |

OTHER PUBLICATIONS

Lehmann, Shay, "Automated Train Identification and Train Position Monitoring at New York City Transit", Jul. 2020, Transportation Research Record, vol. 2674 Issue 9, pp. 844-854. (Year: 2020).*

(Continued)

*Primary Examiner* — Terrell M Robinson

(57) ABSTRACT

Methods and systems implement an output interface of a display computing system to display a visualization of predictive output of an onboard computing system of a train. A display computing system obtains, from an onboard predictive control system of a train traveling along a rail from a departure to a destination, predicted speeds which the predictive control system uses to preemptively adjust control signals sent by an onboard train control system of the train. The display computing system provides a visualization of the predicted speeds obtained by the predictive control system.

20 Claims, 4 Drawing Sheets

(56) References Cited

U.S. PATENT DOCUMENTS

2020/0223458 A1* 7/2020 Marte ................ B61L 25/04
2023/0322279 A1* 10/2023 Oishi ................ E01B 35/08
            702/184

OTHER PUBLICATIONS

Palatability Search Report—Matter No. 21-0786 dated Sep. 1, 2021, 19 pages.

* cited by examiner

200

```
┌─────────────────────────────────────────────────────────────────────┐
│ DISPLAY COMPUTING SYSTEM OBTAINS FIRST DATA SERIES OF MEASURED SPEED│
│ RECORDS AND SECOND DATA SERIES OF PREDICTED SPEED RECORDS AT        │
│ VISUALIZATION TIME                                                   │
│                              202                                     │
└─────────────────────────────────────────────────────────────────────┘
                                    ▼
┌─────────────────────────────────────────────────────────────────────┐
│ DISPLAY COMPUTING SYSTEM CONVERTS TRAIN LENGTH TO OUTPUT INTERFACE  │
│ UNITS                                                                │
│                              204                                     │
└─────────────────────────────────────────────────────────────────────┘
                                    ▼
┌─────────────────────────────────────────────────────────────────────┐
│ DISPLAY COMPUTING SYSTEM SETS WIDTH OF FIRST REGION OF TRACK        │
│ TOPOLOGY AND WIDTH OF SECOND REGION OF TRACK TOPOLOGY EACH IN       │
│ OUTPUT INTERFACE UNITS                                               │
│                              206                                     │
└─────────────────────────────────────────────────────────────────────┘
                                    ▼
┌─────────────────────────────────────────────────────────────────────┐
│ DISPLAY COMPUTING SYSTEM RECORDS ONE OR MORE VISUALIZATION ELEMENTS │
│ IN TRACK PROFILE                                                     │
│                              208                                     │
└─────────────────────────────────────────────────────────────────────┘
                                    ▼
┌─────────────────────────────────────────────────────────────────────┐
│ DISPLAY COMPUTING SYSTEM CONVERTS ONE OR MORE ELEMENTS OF TRACK     │
│ PROFILE TO DISPLAY OBJECTS, AND RENDERS DISPLAY OBJECTS ON OUTPUT   │
│ INTERFACE OF DISPLAY COMPUTING SYSTEM                                │
│                              210                                     │
└─────────────────────────────────────────────────────────────────────┘
```

FIG. 2

PREDICTIVE CONTROL SYSTEM VISUALIZATION FOR AUTOMATIC TRAIN OPERATION

TECHNICAL FIELD

The present disclosure is directed to a computing system display interface, and, more particularly, to configuring an output interface of a display computing system to display a visualization of predictive output of an onboard computing system of a rain.

BACKGROUND

In rail transit, trains are controlled by onboard computing systems configured to electronically control a train by communicating with a train control system, causing the train control system to control accelerating and braking mechanisms of the train in accordance with automatic train control ("ATC"), automatic train protection ("ATP"), and automatic train operation ("ATO"). An onboard computing system of a train can be configured to provide inputs to a train control system to achieve specified operating speeds and operating positions for the train, to substantially conform to a preset profile of target speeds and target positions over time. Operating speed can increase and decrease over time, while operating position should increase over time as the train control system drives the train along a rail towards a destination.

An operating speed profile and an operating position profile describe target speed and target position under ideal conditions. Under non-ideal operating conditions, factors such as equipment condition, inclement weather, train timetables, and the like can cause the operating speed and operating position to deviate from target speeds and target positions. To restore operating speed and operating position to conform to target speeds and target positions as much as possible, onboard computing systems can be configured as proportional-integral-derivative ("PID") controllers, configured to sustain a value of a setpoint by a feedback loop where control signals are sent to drive the train, and speed and position are measured by sensors as feedback.

Onboard computing systems can also be configured by a prediction model to predictively control a train according to a model having various parameters, where the parameters are learned from training data derived from past train trips. An onboard computing system configured as a predictive controller can replace onboard computing systems configured as PID controllers. Such predictive controllers can achieve improved control accuracy over PID controllers. To further improve performance of predictive controllers, a machine learning model can configure a computing system to learn a prediction model.

U.S. Pat. No. 8,788,135 to Daum et al. ("the '135 patent") discloses real-time optimization of a mission plan for a powered system such as a train. In the '135 patent, a method includes determining whether a mission plan is correct, updating information used to establish the mission plan, and updating the mission based on the updated information to satisfy a mission objective. The '135 patent states that the optimizer can continuously display the next operation required, allowing an operator to follow the plan. However, even if an operator follows a plan displayed by such an optimizer, the calculations performed by the optimizer and the decision-making process of such an optimizer cannot be readily reviewed by the operator.

Therefore, there is a need for computations made by a prediction controller of a train to be human-reviewable. Examples of the present disclosure are directed toward overcoming the deficiencies noted above.

SUMMARY OF THE INVENTION

According to a first aspect, a method includes obtaining, by a display computing system, a first data series of measured speed records and a second data series of predicted speed records at a visualization time during travel of a train, wherein the measured speed records indicate measured speeds of the train over a measured span trailing the train in a direction of travel, the predicted speed records indicate predicted speeds of the train over a predicted span ahead of the train in the direction of travel, and the predicted speeds are determined by computing the measured speeds as inputs to a prediction model: and rendering, on a visualized space of an output interface in communication with the display computing system, a measured speed trend comprising the measured speeds in a first region of a track topology and a predicted speed trend comprising the predicted speeds in a second region of the track topology. The prediction model can be learned by training a learning computing system prior to a departure of the train. The learning computing system can be trained by inputting at least one of a sample dataset recording measured speeds of a train over time, and a sample dataset recording simulated speeds of a train over time. The method further includes setting, by the display computing system, a width of a first region of a track topology and a width of a second region of the track topology each in output interface units, wherein the first region comprises a first portion of the track topology trailing the train in the direction of travel, and wherein the second region comprises a second portion of the track topology ahead of the train in the direction of travel. The method further includes reading, by the display computing system, each predicted speed record from the second data series which follows an index of the second data series corresponding to a current position of the train, wherein the predicted speeds rendered by the display computing system comprise each predicted speed record read by the display computing system. The method further includes rendering, by the display computing system, a speed limit trend in the first region and the second region, wherein the display computing system is configured to render the speed limit trend, the measured speeds trend, and the predicted speeds trend at a same scale relative to each other. The method further includes advancing, by the display computing system upon advancement of the visualization time, a span of travel positions mapped proportionally to a width of visualized space in the direction of travel, and re-mapping the advanced span of travel positions to the width of the visualized space.

BRIEF DESCRIPTION OF THE DRAWINGS

FIG. 2 illustrates a flowchart of a predictive control system visualization method according to examples of the present disclosure.

DETAILED DESCRIPTION

Figure 1:
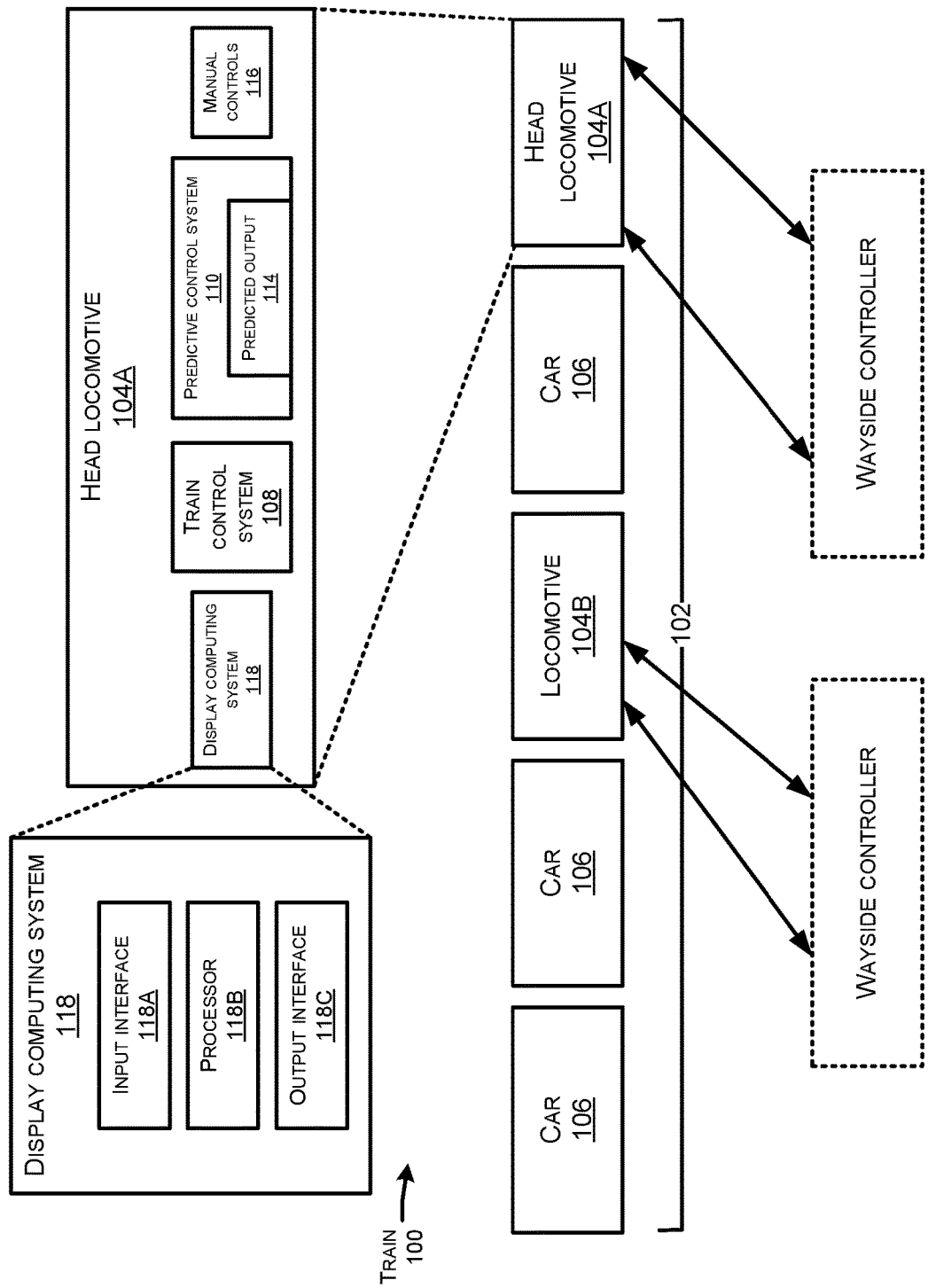
FIG. 1 illustrates onboard computing systems of a train according to examples of the present disclosure.

FIG. 1 illustrates onboard computing systems of a train 100 according to examples of the present disclosure. From front to rear, the train 100 has a length 102, and the length 102 of the train 100 is stored on memory of at least some of the onboard computing systems as one of some number of visualization parameters, as shall be described in further detail subsequently. The train 100 is made up of a head locomotive 104A, some number of other locomotives 104B, and some number of additional cars 106. A head locomotive 104A and other locomotives 104B each further includes one or more engines, one or more brakes, and any number of electrical control circuits which control power to each engine and brake.

Onboard computing system of a train can include any number of processors, where the processors can execute computer-readable instructions stored on a computer-readable storage medium to cause the processors to perform a variety of functions. The onboard computing systems include at least a computing system configured as a train control system 108, and a computing system configured as a predictive control system 110. The train control system 108 and the predictive control system 110 can be the same computing system, or can be different computing systems. Where a train control system 108 is already a component of some trains, a predictive control system 110 can be added to such a train and be configured to be in electronic communication with the train control system 108 as described subsequently.

The train control system 108 is in electronic communication with the electrical control circuits, and one or more processors of the train control system 108 are configured by one or more sets of computer-readable instructions to send input signals to engines and brakes of a head locomotive 104A and other locomotives 104B to cause the train to start, stop, accelerate, or slow. It should be understood that train control systems according to the present disclosure can be referred to by many possible names, such as locomotive control system ("LCS"), or other proprietary or non-proprietary names. However, any onboard computing system configured to send input signals to engines and brakes as described above is a train control system 108 according to the present disclosure.

The predictive control system 110 is in electronic communication with the train control system 108, and one or more processors of the predictive control system 110 are configured by one or more sets of computer-readable instructions to generate predictive outputs according to a prediction model, and send predictive outputs to the train control system 108, the predictive outputs indicating that the train control system 108 should cause the train to accelerate or cause the train to slow.

The train 100 further includes any number of sensors 112, and the predictive control system 110 is further in electronic communication with one or more sensors 112 of the train 100. One or more sensors 112 are each configured to capture measurements, data, images, and the like. The one or more sensors 112 can include, but are not limited to, speed sensors such as semiconductor speed sensors and doppler radar speed sensors, and image capture sensors. One or more processors of the predictive control system 110 are configured by one or more sets of computer-readable instructions to receive input from the one or more sensors 112, compute the input by a prediction model, and obtain predicted output 114 from the prediction model.

One or more onboard computing systems such as a train control system 108 and a predictive control system 110 can furthermore communicate with computing systems not located on the train (illustrated in broken lines in FIG. 1), such as wayside controllers configured to perform ATO operations, by radio transmissions to obtain externally tracked information which cannot be readily derived by sensors, such as a position of a train along a rail from the departure to the destination (subsequently referred to as a "position," for brevity).

One or more speed sensors 112 of the train 100 are operative to determine position changes of the train 100 over time (by operation of integrated circuits of semiconductor speed sensors, doppler radar speed sensors, and other electric and electronic speed sensors as known to persons skilled in the art), and convert position changes over time to speeds of the train 100 as a series of measured speeds over time.

A prediction model can configure a predictive control system to receive measured speeds from one or more speed sensors 112 as input: compute a series of measured speeds by the prediction model: and obtain predicted speeds as output from the prediction model.

Each predicted speed represents a speed which the train 100 is predicted to achieve at a future time and at a future position that the train 100 will travel to. For a series of measured speeds over a period of past time (subsequently a "measured period") and over a span of past positions that the train has traveled over (subsequently a "measured span"), the prediction model configures the predictive control system to obtain predicted speeds over a period of future time following the past time (subsequently a "predicted period") and over a span future positions that the train will travel to (subsequently a "predicted span"). Thus, for various times during the travel of a train 100 from a departure to a destination, at each time, the predictive control system 110 obtains series of predicted speeds for at least a predicted period based on measured speeds over at least a measured period.

A measured period and a predicted period are relative to a visualization time (as shall be described subsequently); as the visualization time advances, periods of future time will progressively become past time, and thus the measured period grows to encompass the former predicted period. Likewise, as the visualization time advances, the measured span grows to encompass the former predicted span. Measured speeds can be measured by speed sensors at regular or non-regular intervals of time, and predicted speeds can be computed by a prediction model across regular or non-regular intervals of time.

The predictive control system 110 can further organize these successive measured speeds and predicted speeds in time order and in position order by recording each measured speed (and corresponding past position) and each predicted speed (and corresponding future position) in a data series. A data series can be a series of data records indexed by time and/or position, and the predictive control system 110 can be configured to write a measured speed and corresponding past time and past position into each record of a first data series, and write a predicted speed and corresponding future time and future position into each record of a second data series, each record of a data series being indexed by time of measurement (past times) or position of measurement (past positions), or by predicted time (future times) or predicted position (future positions). Each measured speed record of a first data series and each predicted speed record of a second data series is a data record written to a computer-readable storage medium of the predictive control system 110.

The predicted period and the predicted span need not be indefinite in duration, and the prediction model can configure the predictive control system to obtain predicted speeds for a finite predicted period. However, the predicted period can be sufficient in duration that, given the interval of predicted speeds as described above, a sufficient number of predicted speeds are obtained to visualize a substantially detailed predicted speeds trend.

Furthermore, the intervals of predicted speeds can vary for various reasons. For example, in the event that a track topology (as shall be described subsequently) indicates that the train will drive through terrain having varying elevations during the predicted period, the predictive control system can be configured to obtain predicted speeds over smaller intervals.

By way of example, a prediction model according to examples of the present disclosure can be a model predictive control ("MPC") model, wherein a cost function includes some number of independent variables and dependent variables to model a train traveling from a departure to a destination as a dynamic system. An MPC model configures a predictive control system 110 to predict changes in dependent variables based on changes in independent variables.

Independent variables of the cost function can include a target operating speed at a target operating position according to a preset profile, and can include a magnitude of a control signal which one or more processors of the predictive control system 110 have sent over an electrical control circuit to an engine and a brake of a head locomotive 104A and other locomotives 104B. Dependent variables of the cost function can include an operating speed of the train 100, and operating position of the train 100, and such measurements. A trained weight set configures a predictive control system 110 to weigh coefficients of a cost function, thereby up-weighing or down-weighing the contribution of one or more independent variables to the values of one or more dependent variables.

By way of example, an MPC model can be a generalized predictive control ("GPC") model, a dynamic matrix control ("DMC") model, and such models wherein a cost function represents a dynamic system including independent variables and dependent variables. Thereby, an MPC model can configure the predictive control system 110 to compute a series of measured speeds as independent variables of an MPC model: and obtain predicted speeds as dependent variables of the MPC model.

The MPC model, including the cost function and coefficients thereof, can be learned by a learning model configuring a learning computing system (where, according to examples of the present disclosure, the learning computing system need not be one of the onboard computing systems) to optimize parameters of the MPC model.

A learning model can include one or more sets of computer-readable instructions executable by one or more processors of a learning computing system to perform tasks. Tasks can include, for example, classification, clustering, matching, regression, and the like. A learning model can include, for example, a layered model such as a deep neural network, which may have a fully-connected structure, may have a feedforward structure such as a convolutional neural network ("CNN"), can have a backpropagation structure such as a recurrent neural network ("RNN"), or can have other architectures suited to the computation of particular tasks.

Such a learning model can be trained by inputting one or more sample datasets into the learning model. The training of the learning model can further be performed on a cost function, wherein the learning model optimizes the cost function based on some number of variables. Based thereon, the learning model can configure a learning computing system to generate and update weight sets over some number of epochs of training, outputting a trained weight set. The predictive control system 110 can thereby be configured by the trained weight set to weigh coefficients of a cost function while computing a series of measured speeds by the learning model.

By way of example, one or more sample datasets can include datasets recording measured speeds of a train over time during past trips from a same departure to a same destination, and can include datasets recording simulated speeds of a train over time according to a simulation computing system configured to compute a simulation of a trip from a same departure to a same destination. Using such sample datasets, a learning model can compute a learning computing system to optimize a cost function of a prediction model to model speeds of a train over time as the train travels from a same departure to a same destination.

According to examples of the present disclosure, the learning computing system need not be one of the onboard computing systems; rather, the learning computing system can be a computing system located anywhere, which learns a prediction model prior to a train departing from a departure location. Based on this prediction model learned prior to departure, a predictive control system 110 is configured to obtain predicted speeds from the prediction model during travel of a train from a departure location to a destination, based on real-time computations performed during travel from the departure location to the destination.

The predictive control system 110 is furthermore configured to, based on the predicted speeds, send electronic instructions to the train control system 108 to cause the train control system 108 to change or maintain magnitudes of control signals the train control system 108 is sending over an electrical control circuit to an engine and a brake of a head locomotive 104A and other locomotives 104B. By way of example, in the event that a predicted speed at a target operating position is higher than a target operating speed at that operating position according to a preset profile, the predictive control system 110 is configured to send electronic instructions to the train control system 108 to cause the train control system 108 to change a magnitude of a control signal sent to a brake of a head locomotive 104A and other locomotives 104B to cause the head locomotive 104A and other locomotives 104B to reduce operating speed of the train 100.

In this fashion, the train control system 108 controls engines and brakes of a head locomotive 104A and other locomotives 104B of a train 100 in real time during travel from a departure to a destination, and the predictive control system 110 predictively controls the train control system 108 to preemptively adjust control signals sent by the train control system 108 to yield operating speeds at operating positions substantially consistent with target operating speeds at those operating positions.

It should be understood that, according to examples of the present disclosure, onboard computing systems such as a train control system 108 and a predictive control system 110 can communicate with computing systems not located on the train, such as wayside controllers configured to perform ATO operations, by radio transmissions. However, according to examples of the present disclosure, the predictive control system 110 is configured by the prediction model to preemptive adjust control signals sent by the train control system 108 in a self-sufficient fashion, without needing additional input from any wayside controllers or other non-onboard computing systems.

Further, the train 100 includes manual controls 116 which are configured to send control signals over an electrical control circuit to an engine and a brake of a head locomotive 104A and other locomotives 104B, overriding control signals sent by the train control system 108. The manual controls 116 can be operated by any human operator aboard the train 100, upon determining that future operating speeds of the train 100 will not conform to target operating speeds according to a preset profile: determining that future operating speeds of the train 100 may lead to errors, failures, violations of speed limits, accidents, and the like: or otherwise at the discretion of the human operator. However, to determine whether to operate the manual controls 106, a human operator needs to view predicted speeds obtained by the predictive control system 110, so as to assess how control signals sent by the train control system 108 will be adjusted by the predictive control system 110.

Therefore, according to examples of the present disclosure, a display computing system 118 is provided for human operators aboard the train 100 during travel from a departure to a destination. The display computing system 118 can be an onboard computing system, where it can be the same as the predictive control system 110, can be a sub-system of the predictive control system 110, or can be separate from the predictive control system 110. The display computing system 118 can be a portable computing system which is temporarily onboard the train 100 rather than integrally onboard the train 100.

A display computing system 118 can be a computing system as shall be described subsequently with reference to FIG. 4. Without reiterating the subsequent description, it should be understood, for the purpose of understanding examples of the present disclosure, that the display computing system 118 may include one or more input interface(s) 118A in communication with one or more processor(s) 118B of the display computing system 118 over a communication bus. The display computing system 118 further includes an output interface 118C. The output interface 118C can be any human-readable display apparatus, such as a display screen or monitor.

By way of example, the one or more input interface(s) 118A can be one or more network adapters in communication with a network adapter of the predictive control system 110, or can be one or more data buses in communication with a processor of the predictive control system 110. Across one or more input interface(s) 118A, one or more processor(s) 118B can be configured to communicate with a processor of the predictive control system 110 to receive a first data series of measured speed records recorded by the predictive control system 110 and a second data series of predicted speed records obtained from the predictive control system 110. Alternatively, in the event that the display computing system 118 is the same as the predictive control system 110, the one or more processor(s) 118B can read a first data series of measured speed records and a second data series of predicted speed records written on a computer-readable storage medium of the predictive control system 110.

Thus, regardless of whether the display computing system 118 is an onboard computing system or not, the display computing system 118 is configured to receive a first data series of measured speed records over a measured period, and a second data series of predicted speed records over a predicted period, from the predictive control system 110, whether by reading these measured speeds and predicted speeds directly from computer-readable storage media of the predictive control system 110, or by receiving the measured speeds and predicted speeds by transmission from the predictive control system 110 to the display computing system 118 by a data bus, a wired or wireless network connection, and the like.

The display computing system 118 further stores some number of visualization parameters which characterize features of the train 100 or characterize features of the train's travel from a departure to a destination. By way of example, such visualization parameters include, but are not limited to, a length 102 of the train 100 as described above: positions of mileposts along the travel from the departure to the destination: track topology of a rail from the departure to the destination; and speed limits for train travel over a rail from the departure to the destination. Such visualization parameters are substantially consistent for each travel from a same departure to a same destination, and do not change regardless of predicted speeds.

Based on the measured speeds, the predicted speeds, and the visualization parameters, the display computing system 118 can visualize a first data series of measured speed records over a traveled track topology and a second data series of predicted speed records over an upcoming track topology, updating the traveled track topology and the upcoming track topology over time. The display computing system 118 is configured to display a visualization of the first data series of measured speed records and the second data series of predicted speed records on an output interface 118C of the display computing system 118.

For example, a visualization can include a line graph, a bar graph, a bubble graph, or otherwise any suitable visualization which displays a trend of values over an independent axis and a dependent axis; and can include at least a track topology across distances, a series of measured speeds over a first region of the track topology, and a series of predicted speeds over a second region of the track topology. The first region includes past positions behind the train in its direction of travel, while the second region includes future positions in front of the train in its direction of travel. Records of the first data series are placed on the visualization in the first region, in accordance with respective corresponding positions, and records of the second data series are placed on the visualization in the second region, in accordance with respective corresponding positions.

FIG. 2 illustrates a flowchart of a predictive control system visualization method 200 according to examples of the present disclosure. It should be noted that some of the operations of method 200 may be performed out of the order presented, with additional elements, and/or without some elements. Some of the operations of method 200 may further take place substantially concurrently and, therefore, may conclude in an order different from the order of operations shown above. It should also be noted that components of the display computing system 118 can be involved in one or more of the operations, as described herein.

At a step 202, a display computing system 118 obtains a first data series of measured speed records and a second data series of predicted speed records at a visualization time from a predictive control system 110. The measured speed records each record a measured speed received by the predictive controller system from a speed sensor, and the predicted speed records each record a predicted speed obtained by the predictive controller system based on computing the measured speeds by a prediction model.

As described above, prior to the steps of the method 200, a prediction model can configure a predictive control system 110 to receive measured speeds from one or more speed sensors as input: compute a series of measured speeds by the prediction model: and obtain predicted speeds as output from the prediction model. Each predicted speed represents a speed which a train is predicted to achieve at a future time and at a future position that the train will travel to. For a series of measured speeds over a measured period and over a measured span, the prediction model configures the predictive control system to obtain predicted speeds over a predicted period and over a predicted span. A measured period and a predicted period are relative to a visualization time: as the visualization time advances, periods of future time will progressively become past time, and thus the measured period grows to encompass the former predicted period. Likewise, as the visualization time advances, the measured span grows to encompass the former predicted span.

Prior to the steps of the method 200, the predictive control system 110 organizes these successive measured speeds and predicted speeds in time order and in position order by recording each measured speed (and corresponding past position) and each predicted speed (and corresponding future position) in a data series. A data series can be a series of data records indexed by time and/or position, and the predictive control system is configured to write a measured speed and corresponding past time and past position into each record of a first data series, and write a predicted speed and corresponding future time and future position into each record of a second data series. Each record of a data series is indexed by time of measurement (past times) or position of measurement (past positions), or indexed by predicted time (future times) or predicted position (future positions). Each measured speed record of a first data series and each predicted speed record of a second data series is a data record written to a computer-readable storage medium of the predictive control system 110.

At 202, the display computing system 118 is configured to receive a first data series of measured speed records over a measured period, and a second data series of predicted speed records over a predicted period, from the predictive control system 110, whether by reading these measured speeds and predicted speeds directly from computer-readable storage media of the predictive control system, or by receiving the measured speeds and predicted speeds by transmission from the predictive control system 110 to the display computing system 118 by a data bus, a wired or wireless network connection, and the like.

Since the measured period and the predicted period each change as the visualization time advances (and so do the measured span and the predicted span), it should be understood that the steps of the method 200 apply to one instance of visualizing the predictive control system 110 for one visualization time. The display computing system 118 is configured to refresh the visualization upon advancement of the visualization time, at a refresh rate which an output interface of the display computing system 118 is configured to display.

At a step 204, the display computing system 118 converts a train length to output interface units. As described above, the display computing system 118 stores some number of visualization parameters which characterize features of the train, including a length of the train. The train length can be stored in units of distance. The display computing system 118 can multiply or divide the train length by a conversion factor to derive the train length in units applicable to displaying a visualization on an output interface, such as pixels. Furthermore, in the event that the train length in output interface units is sufficiently small that the train length as rendered on an output interface of the display computing system 118 would not be legible for human operators viewing the output interface, the display computing system 118 sets a train length to a minimum number of output interface units.

At a step 206, the display computing system 118 sets a width of a first region of a track topology and a width of a second region of the track topology each in output interface units. According to examples of the present disclosure (as shall be illustrated in further detail with reference to FIG. 3), a train (as shall be subsequently illustrated as a train 308 in FIG. 3) is visualized on an output interface traveling laterally in a direction of travel over a track topology (as shall be subsequently illustrated as a track topology 314 in FIG. 3), and the first region of the track topology encompasses a region of the track topology 314 behind a head of the train 308 (as shall be subsequently illustrated as a train head 312 in FIG. 3) to an edge of the track topology. The second region of the track topology 314 encompasses a region of the track topology 314 ahead of the head of the train 308 to an opposite edge of the track topology 314.

Therefore, the display computing system 118 sets a head of a train in output interface units: the first region is as substantially most or all of the track topology behind the head of the train, and the second region is substantially most or all of the track topology ahead of the head of the train (where the first region and the second region can be defined leaving a small gap therebetween, to permit a dividing line to be visualized).

In the event that the visualization parameters do not define a head of a train, the display computing system 118 is configured to set a trailing width behind a tail of the train 308 (as shall be subsequently illustrated as a train tail 310 in FIG. 3) to a default value in output interface units, then add the train length in output interface units to the trailing width to derive the train head 312 in output interface units. In the event that the visualization parameters define a head of a train, the display computing system 118 is configured to subtract the train length in output interface units from the train head 312 in output interface units to derive a trailing width behind a train tail 310 in output interface units.

At a step 208, the display computing system 118 records one or more visualization elements in a track profile. A track profile can be a data record which stores some number of elements which the display computing system 118 converts to display objects rendered on an output interface of the display computing system 118. After each such visualization element is recorded in the track profile, the display computing system 118 is configured to process the track profile and render visual elements, as shall be described subsequently. Most such visualization elements can be described as positions along a rail from the departure to the destination.

The display computing system 118 is configured to record a train body in the track profile. A train body is recorded as a series of elements, such as a list, array, and the like, recording positions where the train body occupies.

The display computing system 118 is configured to record braking zones in the track profile. A braking zone is recorded as one or more positions along a rail where the train is electronically configured to automatically engage brakes. At any given visualization time, there may or may not be braking zones present in the track profile, as shall be described subsequently.

The display computing system 118 is configured to record target operating speeds over time in the track profile. As described above, target operating speeds for particular times and particular positions are in accordance with a preset profile, and the display computing system 118 can read target operating speeds for particular positions, including at least positions of a measured span and positions of a predicted span, and record those target operating speeds and corresponding positions in the track profile. The display computing system 118 can subsequently render target operating speeds recorded in the track profile as a target operating speed trend as described subsequently with reference to FIG. 3.

The display computing system 118 is configured to record a track topology in the track profile. The track topology includes a series of values describing elevation of a rail running from the departure to the destination at various positions along the rail. The display computing system 118 can record track topology values and corresponding positions in the track profile. The display computing system 118 can subsequently render a track topology recorded in the track profile as a track topology 314 with reference to FIG. 3.

The display computing system 118 is configured to record track mileposts in the track profile. Track mileposts include a series of values describing positions of mileposts along a rail running from the departure to the destination at various positions along the rail. The display computing system 118 can record positions corresponding to each track milepost in the track profile. The display computing system 118 can subsequently render track mileposts recorded in the track profile as mileposts 316 with reference to FIG. 3.

The display computing system 118 is configured to record track turnouts in the track profile. Track turnouts include a series of values describing positions of turnouts (i.e., railroad switches) along a rail running from the departure to the destination at various positions along the rail). The display computing system 118 can record positions corresponding to each track turnout in the track profile.

The display computing system 118 is configured to record predicted speeds in the track profile. As described above, predicted speeds include a series of values describing speeds which a train is predicted, by the predictive control system, to achieve at a future position that the train will travel to. The display computing system 118 can subsequently render predicted speeds recorded in the track profile as a predicted speed trend 306 with reference to FIG. 3.

The display computing system 118 obtains a current position of the train from an onboard computing system; by way of example, the onboard computing system can record a current position obtained from a wayside controller configured to perform ATO operations by a radio transmission.

Based on a current position, the display computing system 118 looks up the current position in the second data series: all predicted speeds behind the current position are no longer relevant, as they correspond to positions that the train has already passed. Thus, the display computing system 118 reads each predicted speed record from the second data series which follows an index of the second data series corresponding to the current position. From each predicted speed record which the display computing system 118 reads, the display computing system 118 can record a predicted speed and a corresponding position in the track profile.

The display computing system 118 is configured to record measured speeds in the track profile. As described above, measured speeds include a series of values describing speeds over a measured span the train has traveled over. The display computing system 118 reads each measured speed record from the first data series: generally, no indices of the first data series should exceed the current position of the train.

From each measured speed record which the display computing system 118 reads, the display computing system 118 can record a measured speed and a corresponding position in the track profile.

The display computing system 118 is configured to record a speed limit in the track profile. By way of example, an onboard computing system can record one or more speed limit obtained from a wayside controller configured to perform ATO operations by a radio transmission. One or more speed limits can apply to certain spans of positions along a rail from the departure to the destination. The display computing system 118 can read one or more speed limits and record the speed limits and corresponding positions in the track profile.

After the display computing system 118 writes some or all of the above-described elements in the track profile, the display computing system 118 can perform step 210 as described below.

At a step 210, the display computing system 118 converts one or more elements of the track profile to display objects, and renders the display objects on an output interface of the display computing system 118.

Figure 3:
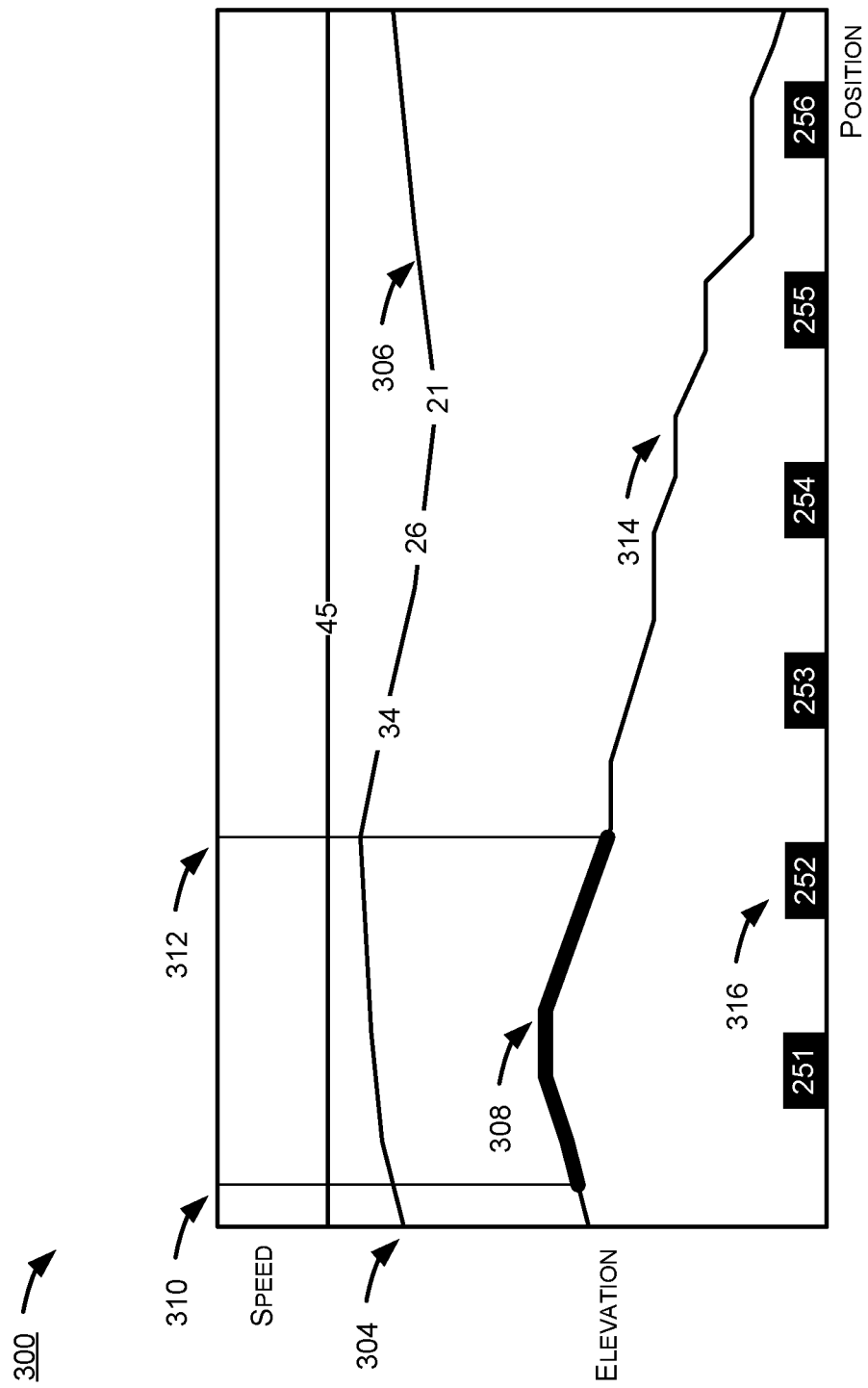
FIG. 3 illustrates display objects rendered on an output interface of a display computing system according to examples of the present disclosure.

FIG. 3 illustrates display objects rendered on an output interface of the display computing system 118 according to examples of the present disclosure. The rendered objects include a speed limit trend 302, a measured speeds trend 304, a predicted speeds trend 306, a train 308, a train tail 310, a train head 312, a track topology 314, and mileposts 316.

The display computing system 118 is configured to render these rendered objects in a visualized space 300 on the output interface of the display computing system 118, the visualized space 300 having a width and a height each in output display units.

A width of the visualized space 300 in output display units represents a span of positions of the train along a rail in a direction running from a departure (towards a first end of the visualized space 300) to a destination (towards a second end of the visualized space 300) projection, where each output display unit is proportional to some actual distance unit spanning the departure to the destination.

A height of the visualized space 300 in output display units represents elevation of the track topology, where each output display unit is proportional to some actual height unit.

A height of the visualized space 300 in output display units can also represent speed, where each output display unit is proportional to some actual unit of speed.

It should be understood that at a visualized time, the entire visualized space 300 and all rendered objects therein are re-rendered based on an updated track profile which is newly generated by another performance of step 208 as described above.

The display computing system 118 is configured to assign positions (in physical distance units) proportionally to values of output interface units (in accordance with the conversion factor as described above) along the width of the visualized space 300. A span of travel positions along a rail from a departure to a destination is thus mapped proportionally to the width of the visualized space 300. This span of travel positions can start at a span of positions at the departure, and, as visualization time progresses, the display computing system 118 can advance the span of travel positions along the rail in the direction of travel towards the destination, and re-map the advanced span of travel positions to the width of the visualized space 300.

The display computing system 118 is configured to render the track topology 314 across the visualized space 300 by drawing the height of the track topology at each position across the span of travel positions of the width of the track topology.

The display computing system 118 is configured to render mileposts 316 across the visualized space 300 by drawing each milepost at a corresponding position across the span of travel positions of the width of the track topology. The display computing system 118 is configured to render braking zones, track turnouts, and the like in a similar fashion.

The display computing system 118 is configured to render the train 308, the train tail 310, and the train head 312 above the track topology within the first region of the track topology, as derived above. The train head 312 is rendered as a vertical line at a position in output interface units which is set as described above. The train 308 is rendered according to the train length trailing the train head 312, tracing a top edge of the track topology for the span of the train length. The train tail 310 is rendered as a vertical line at the end of the train 308 opposite the train head 312.

The display computing system 118 is configured to render a measured speeds trend 304 across the first region, set vertically apart from the track topology 314 and vertically apart from the train 308. At each point across a width of the visualization space 300, the display computing system 118 is configured to render the measured speeds trend 304 vertically in proportion to a value of a measured speed corresponding to a position mapped proportionally to that point. The measured speeds trend 304 can be visualized as a line graph, a bar graph, a bubble graph, or otherwise any suitable visualization which displays a trend of values over an independent axis and a dependent axis.

The display computing system 118 is configured to render a predicted speeds trend 306 across the second region, set vertically apart from the track topology 314 and vertically apart from the train 308. At each point across a width of the visualization space 300, the display computing system 118 is configured to render the predicted speeds trend 306 vertically in proportion to a value of a predicted speed corresponding to a position mapped proportionally to that point. The predicted speeds trend 306 can be visualized as a line graph, a bar graph, a bubble graph, or otherwise any suitable visualization which displays a trend of values over an independent axis and a dependent axis. The display computing system 118 can be further configured to display values of predicted speeds at one or more points over the predicted speeds trend 306.

The display computing system 118 is configured to render a speed limit trend 302 in the first region and the second region, set vertically apart from the track topology 314 and vertically apart from the train 308. At each point across a width of the visualization space 300, the display computing system 118 is configured to render the speed limit trend 302 vertically in proportion to a value of a speed limit corresponding to a position mapped proportionally to that point. The speed limit trend 302 can be visualized as a line graph, a bar graph, a bubble graph, or otherwise any suitable visualization which displays a trend of values over an independent axis and a dependent axis. The display computing system 118 can be further configured to display values of speed limits at one or more points over the speed limit trend 302.

The display computing system 118 can be further configured to render a target operating speed trend in the first region and the second region in a similar fashion.

The display computing system 118 is configured to render the speed limit trend 302, the measured speeds trend 304, and the predicted speeds trend 306 (and a speed limit trend) at a same scale relative to each other.

Thus, in the direction of travel from a departure to a destination, the measured speeds trend 304 is visualized leading into the predicted speeds trend 306. Both trends, viewed in conjunction, visualize the train's speed and changes in speed over past times, and how the train's speed is predicted to change over future times. Both trends can also be visually compared to a speed limit trend 302, as well as a target operating speed trend.

A human operator can therefore view the predicted speeds trend 306 on a display computing system 118 to determine whether the predicted speeds are irregular compared to measured speeds: whether the predicted speeds will reach, fail to reach, or exceed a target operating speed: whether the predicted speeds will exceed a speed limit: and the like. A human operator can also determine whether the predicted speeds will be inappropriate based on mileposts, braking zones, track turnouts, and the like. As the visualization time advances, the display computing system 118 is configured to refresh the visualized space, displaying updated prediction speeds.

Figure 4:
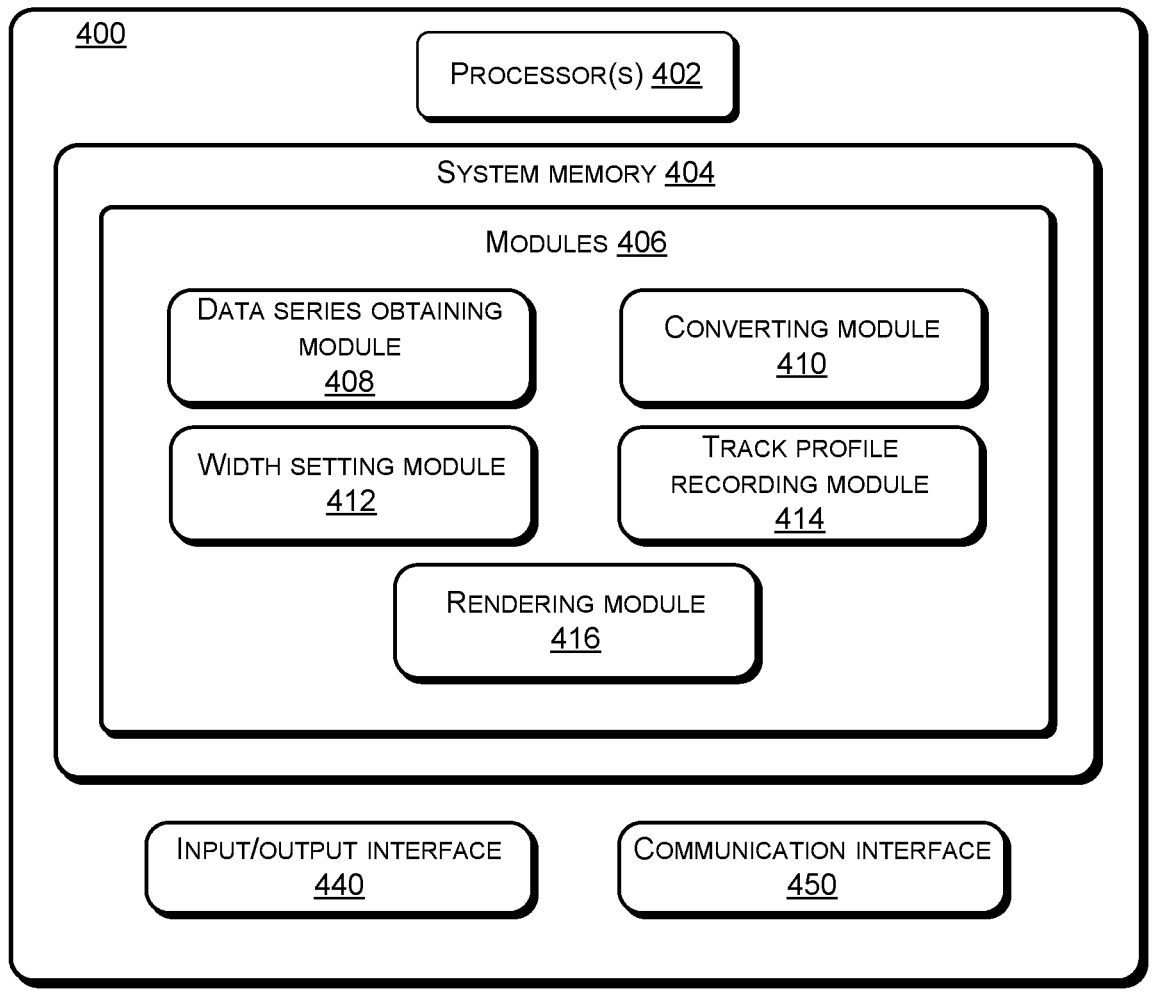
FIG. 4 illustrates an example display computing system for implementing the processes and methods described herein for implementing predictive control system visualization.

FIG. 4 illustrates an example display computing system 400 for implementing the processes and methods described above for implementing predictive control system visualization.

The techniques and mechanisms described herein may be implemented by multiple instances of the display computing system 400, as well as by any other computing device, system, and/or environment. The display computing system 400 shown in FIG. 4 is only one example of a system and is not intended to suggest any limitation as to the scope of use or functionality of any computing device utilized to perform the processes and/or procedures described above. Other well-known computing devices, systems, environments and/or configurations that may be suitable for use with the examples herein include, but are not limited to, personal computers, server computers, hand-held or laptop devices, multiprocessor systems, microprocessor-based systems, set top boxes, game consoles, programmable consumer electronics, network PCs, minicomputers, mainframe computers, distributed computing environments that include any of the above systems or devices, implementations using field programmable gate arrays ("FPGAs") and application specific integrated circuits ("ASICs"), and/or the like.

The display computing system 400 may include one or more processors 402 and system memory 404 communicatively coupled to the processor(s) 402. The processor(s) 402 may execute one or more modules and/or processes to cause the processor(s) 402 to perform a variety of functions. In examples, the processor(s) 402 may include a central processing unit ("CPU"), a graphics processing unit ("GPU"), both CPU and GPU, or other processing units or components known in the art. Additionally, each of the processor(s) 402 may possess its own local memory, which also may store program modules, program data, and/or one or more operating systems.

Depending on the exact configuration and type of the display computing system 400, the system memory 404 may be volatile, such as RAM, non-volatile, such as ROM, flash memory, miniature hard drive, memory card, and the like, or some combination thereof. The system memory 404 may include one or more computer-executable modules 406 that are executable by the processor(s) 402.

The modules 406 may include, but are not limited to, a data series obtaining module 408, a converting module 410, a width setting module 412, a track profile recording module 414, and a rendering module 416.

The data series obtaining module 408 configures the processor(s) 402 to obtains a first data series of measured speed records and a second data series of predicted speed records at a visualization time as described above with reference to FIG. 2.

The converting module 410 configures the processor(s) 402 to convert a train length to output interface units as described above with reference to FIG. 2.

The width setting module 412 configures the processor(s) 402 to set a width of a first region of a track topology and a width of a second region of the track topology each in output interface units as described above with reference to FIG. 2.

The track profile recording module 414 configures the processor(s) 402 to record one or more visualization elements in a track profile as described above with reference to FIG. 2.

The rendering module 416 configures the processor(s) 402 to convert one or more elements of the track profile to display objects, and render the display objects on an output interface of the display computing system as described above with reference to FIG. 2.

The display computing system 400 may additionally include an input/output (I/O) interface 440 and a communication module 450 allowing the display computing system 400 to communicate with other systems and devices over a network. The network may include the Internet, wired media such as a wired network or direct-wired connections, and wireless media such as acoustic, radio frequency ("RF"), infrared, and other wireless media.

Some or all operations of the methods described above can be performed by execution of computer-readable instructions stored on a computer-readable storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

The computer-readable storage media may include volatile memory (such as random-access memory ("RAM")) and/or non-volatile memory (such as read-only memory ("ROM"), flash memory, etc.). The computer-readable storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer-readable storage medium is an example of computer-readable media. Computer-readable media includes at least two types of computer-readable media, namely computer-readable storage media and communications media. Computer-readable storage media includes volatile and non-volatile, removable and non-removable media implemented in any process or technology for storage of information such as computer-readable instructions, data structures, program modules, or other data. Computer-readable storage media includes, but is not limited to, phase change memory ("PRAM"), static random-access memory ("SRAM"), dynamic random-access memory ("DRAM"), other types of random-access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer-readable storage media do not include communication media.

The computer-readable instructions stored on one or more non-transitory computer-readable storage media that, when executed by one or more processors, may perform operations described above with reference to FIGS. 1-3. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

INDUSTRIAL APPLICABILITY

Onboard computing systems of a train can be configured by a prediction model to predictively control the train according to a model having various parameters, where the parameters are learned from training data derived from past train trips. However, prediction models learned by machine learning models are characteristically "black boxes"—that is, their decision-making process, which is configured by a model including one or more cost functions including some number of learned parameters, cannot be readily reviewed by human operators. Many automated trains are staffed by drivers who must be able to control the train in the event of an emergency, and even fully automated trains generally have human-operable controls for such purposes. If human operators are to play roles in preventing errors and failures in driving a train, drivers need not just access to manual controls, but also understanding of the decision-making process of a predictive controller driving a train.

Trains include manual controls which can be operated by any human operator aboard the train, upon determining that future operating speeds of the train will not conform to target operating speeds according to a preset profile; determining that future operating speeds of the train may lead to errors, failures, violations of speed limits, accidents, and the like: or otherwise at the discretion of the human operator. However, to determine whether to operate the manual controls 106, a human operator needs to view predicted speeds obtained by the predictive control system, so as to assess how control signals sent by a train control system of the train will be adjusted by the predictive control system.

Therefore, according to examples of the present disclosure, a display computing system 118 is provided for human operators aboard the train 100 during travel from a departure to a destination. A display computing system 118 obtains, from an onboard predictive control system 110 of a train traveling along a rail from a departure to a destination, predicted speeds which the predictive control system 110 uses to preemptively adjust control signals sent by an onboard train control system 108 of the train. Whereas the predictive control system 110 and the train control system 108 are configured to yield operating speeds substantially consistent with target operating speeds, the predictive control system 110 can potentially cause outcomes which are inconsistent with those target operating speeds. The display computing system 118 visualizes the predicted speeds obtained by the predictive control system 110, enabling human operators to assess how control signals sent by the train control system 108 will be adjusted by the predictive control system 110.

While aspects of the present disclosure have been particularly shown and described with reference to the examples above, it will be understood by those skilled in the art that various additional examples may be contemplated by the modification of the disclosed machines, systems and methods without departing from the spirit and scope of what is disclosed. Such examples should be understood to fall within the scope of the present disclosure as determined based upon the claims and any equivalents thereof.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein.

What is claimed is:

1. A method comprising:
    obtaining, by a display computing system, a first data series of measured speed records and a second data series of predicted speed records at a visualization time during travel of a train, wherein:
    the measured speed records indicate measured speeds of the train over a measured span trailing the train in a direction of travel,
    the predicted speed records indicate predicted speeds of the train over a predicted span ahead of the train in the direction of travel, and
    the predicted speeds are determined by computing the measured speeds as inputs to a prediction model;
    determining an output interface length for the train based on a predetermined threshold length on an output interface of the display computing system;
    determining a position for a visualization of the train on the output interface based on the output interface length; and
    rendering, on a visualized space of the output interface in communication with the display computing system, a measured speed trend comprising:
        the measured speeds in a first region of a track topology comprising the position of the visualization of the train and a trailing distance; and
        a predicted speed trend comprising the predicted speeds in a second region of the track topology.

2. The method of claim 1, wherein the prediction model is learned by training a learning computing system prior to a departure of the train.

3. The method of claim 2, wherein the learning computing system is trained by inputting a sample dataset recording measured speeds of a train over time.

4. The method of claim 1, further comprising setting, by the display computing system, a width of the first region of a track topology and a width of the second region of the track topology each in output interface units;
    wherein the first region comprises a first portion of the track topology trailing the train in the direction of travel; and
    wherein the second region comprises a second portion of the track topology ahead of the train in the direction of travel.

5. The method of claim 1, further comprising reading, by the display computing system, each predicted speed record from the second data series which follows an index of the second data series corresponding to a current position of the train;
    wherein the predicted speeds rendered by the display computing system comprise each predicted speed record read by the display computing system.

6. The method of claim 1, further comprising rendering, by the display computing system, a speed limit trend in the first region and the second region;
    wherein the display computing system is configured to render the speed limit trend, the measured speeds trend, and the predicted speeds trend at a same scale relative to each other.

7. The method of claim 1, further comprising advancing, by the display computing system upon advancement of the visualization time, a span of travel positions mapped proportionally to a width of visualized space in the direction of travel, and re-mapping the advanced span of travel positions to the width of the visualized space.

8. A system comprising:
    one or more processors; and
    memory communicatively coupled to the one or more processors, the memory storing computer-executable modules executable by the one or more processors that, when executed by the one or more processors, perform associated operations, the computer-executable modules comprising:
    a data series obtaining module executable by the one or more processors to obtain a first data series of measured speed records and a second data series of predicted speed records at a visualization time during travel of a train, wherein:
    the measured speed records indicate measured speeds of a train over a measured span trailing the train in a direction of travel,
    the predicted speed records indicate predicted speeds of the train over a predicted span ahead of the train in the direction of travel, and
    the predicted speeds are determined by computing the measured speeds as inputs to a prediction model;
    determining an output interface length for the train based on a predetermined threshold length on an output interface of the display computing system;
    determining a position for a visualization of the train on the output interface based on the output interface length; and
    a rendering module executable by the one or more processors to render, on a visualized space of the output interface in communication with the system, a measured speed trend comprising:
        the measured speeds in a first region of a track topology comprising the position of the visualization of the train and a trailing distance; and
        a predicted speed trend comprising the predicted speeds in a second region of the track topology.

9. The system of claim 8, wherein the prediction model is learned by training a learning computing system prior to a departure of the train.

10. The system of claim 9, wherein the learning computing system is trained by inputting a sample dataset recording measured speeds of a train over time.

11. The system of claim 8, wherein the computer-executable modules further comprise a width setting module executable by the one or more processors to set a width of the first region of a track topology and a width of the second region of the track topology each in output interface units;
   wherein the first region comprises a first portion of the track topology trailing the train in the direction of travel; and
   wherein the second region comprises a second portion of the track topology ahead of the train in the direction of travel.

12. The system of claim 8, wherein the computer-executable modules further comprise a track profile recording module executable by the one or more processors to read each predicted speed record from the second data series which follows an index of the second data series corresponding to a current position of the train;
   wherein the predicted speeds rendered by the one or more processors comprise each predicted speed record read by the one or more processors.

13. The system of claim 8, wherein the rendering module is further executable by the one or more processors to render a speed limit trend in the first region and the second region;
   wherein the one or more processors are configured to render the speed limit trend, the measured speeds trend, and the predicted speeds trend at a same scale relative to each other.

14. The system of claim 8, wherein the rendering module is further executable by the one or more processors to advance, advancement of the visualization time, a span of travel positions mapped proportionally to a width of visualized space in the direction of travel, and re-mapping the advanced span of travel positions to the width of the visualized space.

15. A non-transitory computer-readable storage medium storing computer-readable instructions executable by one or more processors, that when executed by the one or more processors, cause the one or more processors to perform operations comprising:
   obtaining, by a display computing system, a first data series of measured speed records and a second data series of predicted speed records at a visualization time during travel of a train, wherein:
     the measured speed records indicate measured speeds of a train over a measured span trailing the train in a direction of travel,
     the predicted speed records indicate predicted speeds of the train over a predicted span ahead of the train in the direction of travel, and
     the predicted speeds are determined by computing the measured speeds as inputs to a prediction model;
   determining an output interface length for the train based on a predetermined threshold length on an output interface of the display computing system;
   determining a position for a visualization of the train on the output interface based on the output interface length; and
   rendering, on a visualized space of the output interface in communication with the display computing system, a measured speed trend comprising:
     the measured speeds in a first region of a track topology comprising the position of the visualization of the train and a trailing distance; and
     a predicted speed trend comprising the predicted speeds in a second region of the track topology.

16. The non-transitory computer-readable storage medium of claim 15, wherein the prediction model is learned by training a learning computing system prior to a departure of the train.

17. The non-transitory computer-readable storage medium of claim 15, wherein the operations further comprise setting, by the display computing system, a width of the first region of a track topology and a width of the second region of the track topology each in output interface units;
   wherein the first region comprises a first portion of the track topology trailing the train in the direction of travel; and
   wherein the second region comprises a second portion of the track topology ahead of the train in the direction of travel.

18. The non-transitory computer-readable storage medium of claim 15, wherein the operations further comprise reading, by the display computing system, each predicted speed record from the second data series which follows an index of the second data series corresponding to a current position of the train;
   wherein the predicted speeds rendered by the display computing system comprise each predicted speed record read by the display computing system.

19. The non-transitory computer-readable storage medium of claim 15, wherein the operations further comprise rendering, by the display computing system, a speed limit trend in the first region and the second region;
   wherein the display computing system is configured to render the speed limit trend, the measured speeds trend, and the predicted speeds trend at a same scale relative to each other.

20. The non-transitory computer-readable storage medium of claim 15, wherein the operations further comprise advancing, by the display computing system upon advancement of the visualization time, a span of travel positions mapped proportionally to a width of visualized space in the direction of travel, and re-mapping the advanced span of travel positions to the width of the visualized space.

* * * * *